3,452,178
APPARATUS FOR SPOT-HEATING OF WORK-
PIECES BY LASER RADIATION
Werner Kleen, Munich, Germany, assignor to Siemens
Aktiengesellschaft, Munich, Germany, a corporation
of Germany
Filed June 12, 1964, Ser. No. 374,718
Claims priority, application Germany, June 14, 1963,
S 85,686
Int. Cl. B23k 9/08; H01s 3/00; H01j 37/22
U.S. Cl. 219—121                                14 Claims

ABSTRACT OF THE DISCLOSURE

A laser-beam control concentrates high-intensity laser radiation upon a spot of a workpiece on a workpiece holder. A field-producing device has between the holder and the beam control an ion-active deflector field for deflecting from the holder and the control the charged particles issuing from the workpiece during operation.

---

Figure 1:
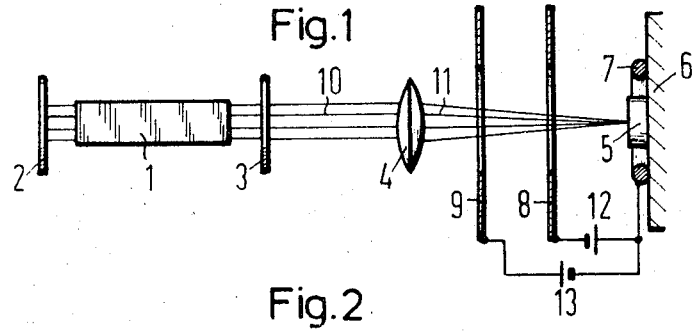

My invention relates to apparatus for performing work on materials by subjecting them to high-intensity heat or light radiation, produced particularly by a laser and directed onto a limited spot of the material through beam control means which focus or deflect the radiation.

The use of laser techniques, permitting the generation of high-intensity and very sharply focussed radiation in the optical and infrared spectra ranges, has afforded an improvement and greater versatility of heat-radiation processing on workpieces of metals, ceramics, synthetic plastics or other materials, generally, the focussing and/or deflection of the high-intensity radiation, having a frequency usually in the above-mentioned spectral ranges, is performed by means of image-forming and/or beam deflecting devices as known, for example, from photographic techniques. Such devices, in most cases, are highly sensitive to soiling of the surfaces traversed by the radiation. Hence, when applying heat radiation to workpieces and thus heating the material at least locally, to extreme temperatures, such as up to vaporization, it is necessary to resort to expedients for protecting the above-mentioned focussing or deflecting devices from clouding or obscuring, as may be caused for example by deposition of the vaporized material.

It is an object of my invention to provide effective means for attaining such a protection and also securing a prolonged effectiveness of the desired protection.

To this end, and in accordance with my invention, a device for the processing of workpieces by high-intensity laser radiation is provided with field means which produce an ion deflection field between the workpiece and the devices used for focussing and/or deflecting the radiation onto the workpiece spot to be heated, these focussing and deflecting devices being herein collectively called "beam-control means." The field thus maintained during operation of the apparatus between the beam-control means and the workpiece or its holder is predominantly directed away from the radiation axis so that any charged particles issuing from the workpiece are deflected away from the beam-control means as well as away from the workpiece spot.

When materials are heated with extreme suddenness, for example by impact-vaporization of an electric conductor due to short-circuiting or by the effect of high-intensity laser radiation upon absorbing substances, surge of particles in vaporized condition is issued from the material. The invention is based upon the observation that these particles, as they are flung away from the suddenly heated spot, can be influenced as to their respective motions by subjecting them to electrical or magnetic fields, or conjointly to both kinds of fields. This observation is surprising because no such field-responsive effect has been known to occur in the conventional practice of vaporizing materials, for example from crucibles or boats. A considerable proportion of the particles dissolved out of the workpiece by the action of the high-intensity heat radiation is positively charged electrically. Apparently this is due to thermal emission of electrons. Occasionally, particles have also been found to exhibit a negative charge, probably resulting from the capture of electrons emitted from other particles. These observations and discoveries are utilized to advantage in apparatus according to the invention described above.

As mentioned, the ion deflector fields to be provided according to the invention are given such a special arrangement that the charged particles issuing from the workpiece are guided away from the beam-control means. However, the following requirements should be kept in mind.

Especially in cases where the processing is performed in vacuum (or at any negative pressure) it must be taken into account that the charged and accelerated particles do not in each case follow the electrical or magnetic field lines. According to another, more specific, feature of the invention, therefore, such particles are prevented from reaching the beam-control means by mounting field-producing electrodes or magnets in asymmetrical relation to the radiation axis of the apparatus. This axis, as a rule, is defined by the straight connecting line between the focussing and/or deflecting means and the workpiece spot, and as a rule, is identical with the optical axis of the laser radiation immediately ahead of the workpiece.

In cases where the workpiece is not electrically conducting or only very poorly conducting, it is preferable when employing an electrical deflecting field, to have a field electrode located in the immediate vicinity of the workpiece so that this electrode largely determines the electrical potential in proximity of the workpiece. This workpiece-adjacent electrode is preferably constituted by the support or holder for the workpiece or by an electrically conductive embedding mass in which the workpiece is partly embedded for the purpose of mounting it at the working location.

The above-mentioned and further objects, advantages and features of my invention, said features being set forth with particularity in the claims annexed hereto, will be apparent from the following in conjunction with a description of embodiments of apparatus according to the invention illustrated by way of example in the accompanying drawings, in which:

FIGS. 1, 2, 3, 4 and 5 show schematically respectively different embodiments of the processing apparatus of the present inventions, partly in section, the same reference numerals being used in all of the illustrations for respectively similar components.

In each of FIGS. 1 to 5 is a laser-active body 1, for example a ruby rod or a tube filled with laser-active gas, such as a neon-helium mixture. The laser-active body is located between reflectors 2 and 3 which reflect the radiation generated or amplified in body 1, the reflector 3 being partly transparent to the laser radiation. When the body 1 consists of a ruby rod or other crystalline body, the reflectors 2 and 3 may be formed by the mirrored, for example silvered, end faces of the crystalline body. In FIGS. 1 to 4 the above-mentioned beam-control means are schematically represented by a focussing lens 4 which concentrates the issuing beam of laser radiation onto a spot on the workpiece 5 mounted on a holder 6.

Since lasers are known as such and the particular design and operation of the laser is not essential to the invention proper, further details of the laser device are not illustrated and described herein. If desired, reference may be had to such publications as the following: Vogel and Dulberger, "Lasers: Devices and Systems," Electronics, Oct. 27, Nov. 3, Nov. 10, and Nov. 24, 1961; Nathan and Burns, "Injection Lasers," Electronics, Dec. 6, 1963; Johnson, "Injection Laser Systems," Electronics, Dec. 13, 1963.

The embodiment shown in FIG. 1 is provided with means for producing an electric field between the focussing lens 4 and the workpiece 5 on holder 6. The field-producing means comprise a ring-shaped electrode 7 and two flat diaphragm electrodes 8 and 9 connected to voltage sources 12 and 13. The electrode 7 is located in the immediate vicinity of the workpiece 5 which in the embodiment of FIG. 1 is presumed to consist of electrically nonconducting material. The electrodes 8 and 9 are preferably kept at respectively different potentials. For example, the electrode 8 is maintained at about −100 v., and the electrode 9 at about +100 v. relative to the electrode 7. That is, in this case the potential of the workpiece-adjacent electrode 7 is intermediate the respective potentials of the diaphragm electrodes 8 and 9. Each of the diaphragm electrodes 8 and 9 may also be replaced by electrically conducting grid or mesh structures.

The radiation 10 issuing from the laser 1 is focussed by lens 4 onto a spot of the workpiece 5. The intensive heat produced in the workpiece 5 by the focussed radiation 11 separates particles of the material which enter into the electric field between the electrodes 7, 8 and 9 where they are accelerated and drawn off in accordance with their respective electric charges.

Figure 2:
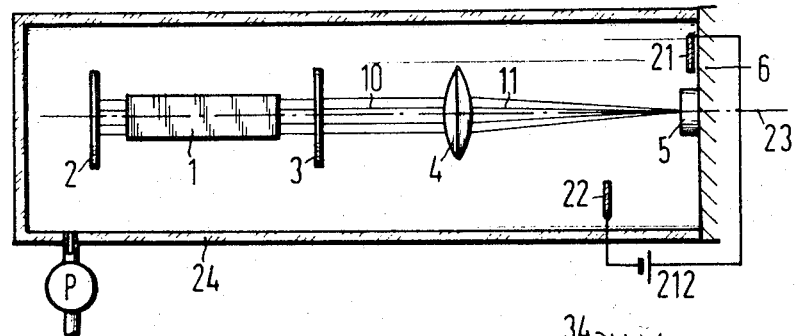

The embodiment shown in FIG. 2 is also provided with an electric field device for deflecting material particles away from the focussing lens 4. This device comprises electrodes 21 and 22 formed of metal strips which are mounted in asymmetrical position to the axis 23 of the focussed beam. The electrodes 21 and 22 may have the shape of straight pieces or may be arcuate, for example nearly semicircular, being curved about the axis 23. In this case, the assumption is made that the workpiece 5 consists of nonconducting material. If the material is conducting, the electrode 21 can be dispensed with, and the workpiece 5 itself or its holder can be connected to the voltage source 212 to serve as a field electrode.

Figure 3:
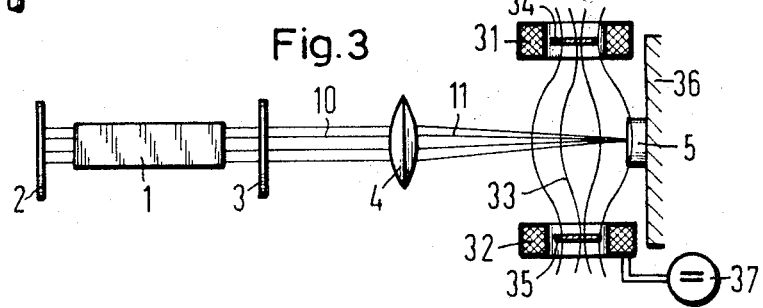

In the embodiment according to FIG. 3 the elimination of the particles resulting from vaporization of material at the workpiece 5 is effected by means of combined electrical and magnetic fields. Two circular coils 31 and 32 are aligned on diametrically opposite sides of the beam axis and are preferably spaced equally therefrom. The two coils are energized by electric current, it being irrelevant whether they are connected in series or parallel to the source 37. The magnetic field produced by the coils is schematically indicated at 33. Mounted near or in the coils 31 and 32 are respective electrodes 34 and 35 which are preferably given respectively different potentials of which one is positive and the other negative relative to the potential of the workpiece 5. The particles accelerated by the electrical field of components 5, 34 and 35 are deflected in dependence upon their respective speeds and are then forced to travel on paths extending, for example, approximately helically about the lines of magnetic force.

Figure 4:
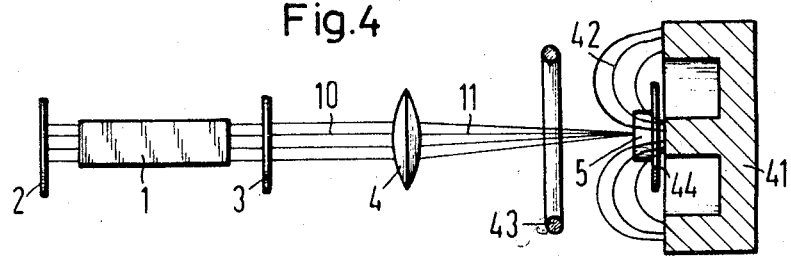

The embodiment shown in FIG. 4 is provided with a pot-shaped magnet 41 which may also be replaced by an M-shaped magnet. The pot-shaped magnet has a central pole of one magnetic polarity surrounded by a peripheral pole of the opposite polarity. It is preferable to make the workpiece holder 44 rather thin and of a nonferromagnetic material. The inhomogeneous field of the pot magnet is schematically represented by field lines 42. The apparatus is further provided with a ring-shaped electrode 43 for accelerating the charged particles. In many cases, the electrode 43 can be omitted because the vaporizing particles already possess a considerable starting speed which causes them to travel on a path largely parallel to the lines of magnetic force.

It is advisable, as a rule, to keep the electrode voltages, depending upon the gas pressure under which the material is being processed, below 10 to 100 v. Thus, the apparatus shown in FIG. 2 is equipped with a vacuum envelope composed of the specimen base and a removable tubular portion 24 of glass which can be connected to a vacuum pump P. For operating at a negative pressure of 10 mm. Hg, a voltage of about 100 v. between electrodes 21 and 22 has been found well suitable. Tests have also shown that it is particularly advantageous to combine electrical and magnetic fields as exemplified by FIGS. 3 and 4.

In case where it is found that the degree of ionization of the particles issuing from the workpiece is not sufficiently high for satisfactory protection of the beam-focussing and/or deflecting devices, the electrical voltage between the electrodes can be increased beyond the above-mentioned values so that a gas discharge between these electrodes takes place. In this manner, the degree of ionization is increased and the protective effect of the fields is improved.

Figure 5:
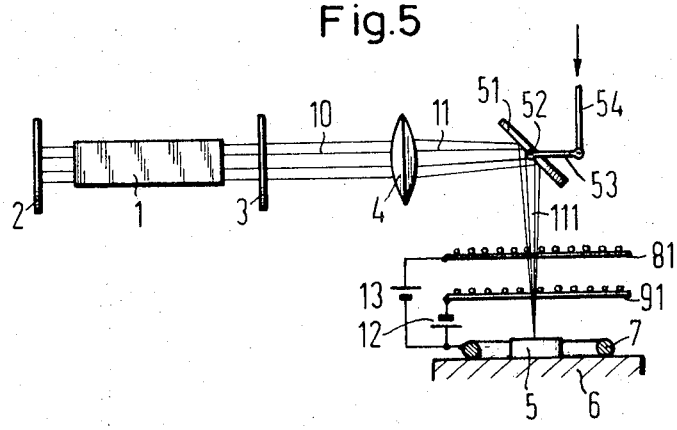

The embodiment shown in FIG. 5 corresponds essentially to that described above with reference to FIG. 1 and is additionally provided with a deflector device consisting of a mirror 51 pivotally mounted at 52, the deflected beam being denoted by 111. The mirror 51 is joined with levers 53, 54 which permit angularly adjusting the deflector. In lieu of the ring-shaped diaphragm electrodes 8 and 9 of FIG. 1, the apparatus according to FIG. 5 is provided with grid or mesh electrodes 81 and 91.

To those skilled in the art it will be obvious, upon a study of this disclosure, that my invention permits of various modifications with respect to design and arrangement of components and hence can be given embodiments other than particularly illustrated and described herein, without departing from the essential features of the invention and within the scope of the claims annexed hereto.

I claim:
1. Apparatus for spot-heating of a workpiece by high-intensity laser radiation, comprising workpiece holder means, laser-beam control means for concentrating the laser radiation upon a spot of the workpiece on said holder means, and a field-producing device having between said holder means and said beam-control means an ion-active deflector field for deflecting from said two means the charged particles issuing from the workpiece during operation of the apparatus.

2. In apparatus for spot-heating of a workpiece by high-intensity laser radiation according to claim 1, said laser-beam control means comprising focussing lens means for concentrating the laser radiation upon the workpiece spot to be heated.

3. In apparatus for spot-heating of a workpiece by high-intensity laser radiation according to claim 1, said field-producing device comprising electrode means near the workpiece location of said holder means for producing an electric deflector field.

4. In apparatus for spot-heating of a workpiece by high-intensity laser radiation according to claim 2, said lens means defining an optical axis of the laser beam impinging upon said workpiece spot, and said field-producing device comprising electrode means near the workpiece location of said holder means for producing an electric deflector field, said electrode means being asymmetrical relative to said axis.

5. In apparatus for spot-heating of a workpiece by high-intensity laser radiation according to claim 1, said field-producing means comprising at least one grid electrode between said holder means and said beam-directive means for producing an electric deflector field.

6. In apparatus for spot-heating of a workpiece by high-intensity laser radiation according to claim 1, said field-producing means comprising at least one centrally apertured diaphragm electrode coaxially surrounding the beam path between said holder means and said beam-directive means for producing an electric deflector field.

7. In apparatus for spot-heating of a workpiece by high-intensity laser radiation according to claim 1, said field-producing device comprising a plurality of electrodes having respectively different electric potentials and being axially spaced from each other between said holder means and said beam-control means for producing an electric deflector field.

8. Apparatus for spot-heating of a workpiece by high-intensity laser radiation according to claim 7, wherein the one of said electrodes that is located closest to the workpiece has an electric potential intermediate said potentials of the respective other electrodes.

9. In apparatus according to claim 7 for heating an electrically conductive workpiece, said workpiece having an electric potential intermediate said potentials of the respective electrodes.

10. Apparatus for spot-heating of a workpiece by high-intensity laser radiation, comprising workpiece holder means, laser-beam control means for concentrating the laser radiation upon a spot of the workpiece on said holder means, and magnet means having a magnetic field whose predominant direction is transverse to the beam path between said holder means and said beam-control means for deflecting from said two means the charged particles issuing from the workpiece during operation of the apparatus.

11. In apparatus for spot-heating of a workpiece by high-intensity laser radiation according to claim 10, said magnet means comprising a core structure adjacent to said holder means and having an inhomogeneous magnetic field between said holder means and said beam-control means.

12. In apparatus for spot-heating of a workpiece by high-intensity laser radiation according to claim 7, the potential difference between two of said electrodes being sufficiently high to produce an electric gas discharge between said two electrodes.

13. In apparatus for spot-heating of a workpiece by high-intensity laser radiation according to claim 1, said field-producing device comprising magnet means and electric electrode means, said magnet means and said electrode means having respective fields in a common region and directed transverse to the beam path.

14. In apparatus for spot-heating of a workpiece by high-intensity laser radiation according to claim 13, said magnet means comprising two coils coaxially aligned on diametrically opposite sides of the beam path in radially spaced relation thereto, and said electrode means comprising two electrodes near said respective coils.

References Cited

UNITED STATES PATENTS

| | | |
|---|---|---|
| 2,642,535 | 6/1953 | Schroeder. |
| 2,887,582 | 5/1959 | Craig. |
| 2,908,821 | 10/1959 | Schumacher. |
| 3,192,383 | 6/1965 | Green. |
| 3,265,855 | 8/1966 | Norton _____ 331—94.5 |

RICHARD M. WOOD, *Primary Examiner.*

W. D. BROOKS, *Assistant Examiner.*